(12) United States Patent
Imura (10) Patent No.: US 6,827,008 B2
(45) Date of Patent: Dec. 7, 2004

(54) NON-WASHING RICE MANUFACTURE APPARATUS AND NON-WASHING RICE MANUFACTURE METHOD

(76) Inventor: Satoru Imura, No. 255-9, Immbe, Wakayama-Shi, Wakayama-Ken 640-8302 (JP)

( * ) Notice: Subject to any disclaimer, the term of this patent is extended or adjusted under 35 U.S.C. 154(b) by 509 days.

(21) Appl. No.: 09/939,177

(22) Filed: Aug. 24, 2001

(65) Prior Publication Data

US 2003/0015103 A1 Jan. 23, 2003

(30) Foreign Application Priority Data

Jul. 5, 2001 (JP) ........................................ 2001-205092

(51) Int. Cl.$^7$ .............................. A23L 1/00; B02B 1/06; B02B 3/00; A23K 1/00; C05F 5/00
(52) U.S. Cl. ............................ 99/519; 99/524; 99/600; 99/606; 99/611; 99/613
(58) Field of Search ......................... 99/516, 519–524, 99/525–531, 617–622, 600–612, 584; 241/86.1, 88.2, 92, 93, 37.5, 7, 14, 74, 260.1, 261.1, 300; 494/2, 24, 49, 35, 29, 36; 426/481–483; 210/360.1, 380.1, 167, 168, 100, 108

(56) References Cited

U.S. PATENT DOCUMENTS

| | | | | |
|---|---|---|---|---|
| 3,334,675 A | * | 8/1967 | Toshihiko | ..................... 99/489 |
| 3,784,092 A | | 1/1974 | Gibson | ........................ 233/20 |
| 3,791,576 A | | 2/1974 | Bazil | ............................ 233/19 |
| 4,324,175 A | * | 4/1982 | Satake | ........................ 99/519 |
| 4,357,371 A | * | 11/1982 | Heinrich et al. | ............. 427/238 |
| 4,658,712 A | * | 4/1987 | Spencer | ........................ 99/576 |
| 4,905,917 A | * | 3/1990 | Fetzer et al. | .................. 241/30 |
| 4,949,632 A | * | 8/1990 | Camerini Porzi | ............ 99/468 |
| 4,978,078 A | * | 12/1990 | Vadnay | ........................ 241/74 |
| 5,020,732 A | * | 6/1991 | Bahrani | ........................ 241/7 |
| 5,033,371 A | * | 7/1991 | Satake et al. | .................. 99/519 |
| 5,379,949 A | * | 1/1995 | Massen et al. | ................. 241/30 |
| 5,394,792 A | * | 3/1995 | Satake et al. | .................. 99/519 |
| 5,699,724 A | * | 12/1997 | Wettstein et al. | ............. 99/489 |
| 5,795,477 A | | 8/1998 | Herman et al. | ........... 210/360.1 |
| 5,906,733 A | | 5/1999 | Purvey | ........................ 210/100 |
| 6,019,717 A | | 2/2000 | Herman | ........................ 494/49 |
| 6,457,404 B1 | * | 10/2002 | Munesada et al. | ............. 99/519 |

FOREIGN PATENT DOCUMENTS

| | | |
|---|---|---|
| GB | 2 297 505 | 8/1996 |
| JP | 11057500 | 3/1999 |
| JP | 11057501 | 3/1999 |
| JP | 2000042429 | 2/2000 |
| JP | 2001009297 | 1/2001 |
| JP | 2001113186 | 4/2001 |

\* cited by examiner

*Primary Examiner*—Timothy F. Simone
(74) *Attorney, Agent, or Firm*—Barry R. Lipsitz; Douglas M. McAllister (57) ABSTRACT

The present invention intends to realize a non-washing rice presenting a good taste by performing the pressure rice washing under the most appropriate conditions in correspondence to the polished rice to be washed.

Said problems are solved by a non-washing rice manufacture apparatus, comprising a pressure rice washing means for washing polished rice by intermediate of water and air, a rinsing dehydrating means for removing water adhered to the polished rice passed through the pressure rice washing process, a moisture adjustment means for drying polished rice passed through rinsing dehydrating and adjusting the moisture content thereof to a predetermined value, and a rice washing intensity adjustment means for controlling as desired the intensity of rice washing in the pressure rice washing process according to the conditions that the polished rice presents; wherein said rice washing intensity adjustment means is composed of a rice washing pressure adjustment means for controlling as desired the pressure to the polished rice in said pressure rice washing means.

8 Claims, 6 Drawing Sheets

NON-WASHING RICE MANUFACTURE APPARATUS AND NON-WASHING RICE MANUFACTURE METHOD

BACKGROUND OF THE INVENTION

1. Technical Field of the Invention

The invention of the Application relates to a manufacture technology of so-called "non-washing rice" dispensing from rice washing before cooking, that can be cooked only by adding water, and moreover, presenting a long shelf life, and more particularly, to a manufacturing method of non-washing rice for washing rice under the rice washing conditions appropriate for the polished rice to be used and an apparatus thereof.

2. Related Art

If the polished rice is washed with water by an ordinary method, water penetrates into the polished rice increasing the moisture content, provoking easily mold or putrefaction, and it can not become a non-washing rice that can be treated similarly to the ordinary polished rice. Howsoever, if a polished rice once presented a high moisture content by washing with water is dried, as the starch layer of the polished rice has a characteristic to swell upon water absorption and to shrink upon drying (refer to Japan Patent Publication HEI 3-36496), only the surface layer of the polished rice shrinks suddenly upon drying, a tensile force acts on the surface section, generating cracking. It is well known that, upon cooking, the polished rice presenting cracking swells unevenly due to infiltration of a quantity of water through the cracking, or a quantity of starch grains, resulting in a rise extremely bad in consistency and taste.

Therefore, technologies for obtaining a non-washing rice easy to conserve, and presenting a good taste, by washing within an extremely short time before almost no water infiltrates inside the polished rice, and removing immediately water adhered to the surface of the polished rice is proposed in the Japan Patent Application. Laid-Open Publication HEI 2-242647 and the Japan Patent Application. Laid-Open Publication HEI 3-154643. These technologies can manufacture theoretically a non-washing rice free from cracking, as they do no dry a polished rice once presented a high moisture content to reduce the moisture content.

However, depending on the washing water temperature, or the nature of raw material of polished rice, it is difficult to wash the polished rice and remove water adhered to the surface, within such a short time that the water infiltrating the polished rice remains within around 1 weight % of the polished rice, by applying publicly known rice washing apparatuses or dehydrating (evaporation drying) apparatuses.

For, when polished rice is cooked without washing, rice smells bran, rice becomes yellow, or rice become crumbling without consistency, mainly because a semi-liquid mixture (called ariulone residue) presenting an extremely high viscosity composed of oils, greases, proteins, or carbohydrates contained in the ariulone layer (starch layer) which is the lowest layer of the bran layer of the brown rice, adheres to the surface of the polished rice (refer to the Japan Patent Application. Laid-Open Publication HEI 3-154643), and it is necessary to remove this ariulone residue almost completely. By the way, ariulone residue is difficult to isolate from the polished rice only by floating the polished rice in water, because of its high viscosity, and it is necessary to soak the polished rice in the water and rub the surface of the polished rice to isolate. However, the polished rice reduces in strength upon water absorption, and especially, the cell structure of the surface becomes vulnerable, and the damage thereof will affect badly the taste similarly as cracking, so it is a taboo to apply a strong friction force to the surface of the polished rice.

Consequently, the conventional rice washing apparatus is composed, independent of the method thereof (there are methods for rotating an agitation wings in a washing tube and agitating water and polished rice, for inputting water and polished rice in a washing tube where an impeller is fixed inside and rotating the washing tube per se, for agitating water and polished rice transporting the polished rice by a screw conveyer, for jetting a strong water flow or air flow to the polished rice in the water for agitation, or other methods), to weaken the friction force applied to the polished rice not to damage the polished rice in any method, but to assure a sufficient washing by taking, in place thereof, a relatively long time for washing. Consequently, it is substantially impossible to remove ariulone residue almost completely, within a short time appropriate for the non-washing rice manufacture, using such a rice washing apparatus.

In addition, as for the removal of adhered water also, centrifugal dehydrater or net conveyer (evaporate adhered water by wind) or others may be conceived as publicly known apparatus; however, only by dehydrating with a centrifugal dehydrater, it takes time for further dehydration from the time point when the adhered water became about 3 weight % or less of the polished rice, and an excessive filtration of adhered water into the inside of the polished rice generates.

On the other hand, for the net conveyer, it is difficult to make the wind come into contact evenly with all over the surface of the polished rice, and there is every chance that a part of grains of the polished rice, or, a part of area of a grain of polished rice is dried excessively, causing a so-called irregular drying, and provoking the cracking. It might be proposed to evaporate by rolling the polished rice in order to prevent this, however, this will damage the structure of the polished rice surface layer softened by water absorption.

From the foregoing, it can not be said that an apparatus executable for washing the polished rice and removing the adhered water is disclosed in the Japan Patent Application. Laid-Open Publication HEI 2-242647, and, in the non-washing rice manufacture apparatus disclosed in the Japan Patent Application. Laid-Open Publication HEI 3-154643, is believed to be capable of manufacturing anyhow a non-washing rice, it should be improved further, in order to manufacture a high quality non-washing rice independently of washing water temperature, relative humidity of the atmosphere, or other conditions.

Therefore, the inventor of this Application, has previously invented a novel non-washing rice manufacture apparatus, and this non-washing rice manufacture apparatus is registered as the U.S. Pat. No. 2,141,449.

This patented invention has made possible to perform the processing from washing to evaporation for the polished rice within a short period of time and, moreover, to manufacture actually a non-washing rice dispensing from rice washing before cooking, and presenting an excellent taste and a long shelf life.

By the way, the nature of the polished rice used for manufacturing the non-washing rice varies according to the rice quality, kind, moisture content, polishing degree, age after the harvest, or others, and they don't have all the same nature. Consequently, it is necessary to adjust the washing intensity according to the conditions that the polished rice presents.

However, in the aforementioned conventional technology, no measure is taken for controlling the washing step according to the nature of the polished rice. In the course of improvement study of said non-washing rice manufacture apparatus, the inventor of the present invention has remarked that a polished rice having a better taste can be manufactured, by controlling the washing condition according to the conditions of the polished rice.

SUMMARY OF THE INVENTION

The present invention intends to solve the aforementioned conventional problems, by a non-washing rice manufacture apparatus, comprising:

a pressure rice washing means for washing polished rice through intermediate of water and air, a rinsing dehydrating means for removing water adhered to the polished rice passed through the pressure rice washing process, a moisture adjustment means for drying polished rice passed through rinsing dehydrating to adjust the moisture content thereof to a predetermined value, and a rice washing intensity adjustment means for controlling as desired the intensity of rice washing in the pressure rice washing process according to the conditions that the polished rice presents; wherein:

said pressure rice washing means has a plurality of water injection means for supplying polished rice with washing water, and an agitation roll provided with a helical projecting rib on the peripheral surface is disposed rotationally drivable in an agitation tube having an inlet of polished rice at one end and an outlet at the other end;

said rinsing dehydrating means is formed by disposing in a rotationally drivable manner a centrifugal dehydrating tube provided with a porous peripheral wall, disposing a screw tube inside the centrifugal dehydrating tube coaxially with the centrifugal dehydrating tube and differentially and rotationally drivable with the centrifugal dehydrating tube, pushing a rice supply pipe for supplying in the screw tube with polished rice from the pressure rice washing means through the screw tube, and providing a rice discharge port for discharging polished rice supplied from a rice supply pipe toward the peripheral wall of the centrifugal dehydrating tube, a screw blade for moving axially polished rice discharged from the rice discharge port along the peripheral wall of the centrifugal dehydrating tube, and a rinse water discharge port for discharging rinse water toward the polished rice moved by the screw blade;

said moisture adjustment means comprises a net disposed rotationally drivable for deploying polished rice from the rinsing dehydrating means over the top face thereof, and a suction blower for sucking air from under the net; and the rice washing intensity adjustment means is composed of a rice washing pressure adjustment means for controlling as desired the pressure to the polished rice in said pressure rice washing means.

In said composition, the rice washing intensity adjustment means may be composed of a pressure rice washing means whose inclination angle in the axial direction of the agitation tube can be set as will, an angle adjustment means for setting said pressure rice washing means to a desired inclination angle, and a rotation speed adjustment means of the agitation roll.

In any one of said compositions, the helical projecting rib formed on the peripheral surface of the agitation roll may comprises a polished rice feed section, a rice washing section and a polished rice carrying-out section, the pitch of the helical projecting rib of said respective section being smaller in the feed section than that in the rice washing section, and larger in the carrying-out section than that in the rice washing section, and a drain section having a number of small holes may be provided at points corresponding to said rice washing section and carrying-out section on the peripheral surface of the agitation tube.

Further, in any one of said compositions, a draft may be disposed upper than the rinse water discharge port of the screw tube peripheral wall, and a wind generating blade rotating integrally with the centrifugal dehydrating tube is disposed outside the centrifugal dehydrating tube peripheral wall.

Moreover, in any one of the aforementioned compositions, a draft may be disposed upper than the rinse water discharge port of the screw tube peripheral wall, the surrounding of the centrifugal dehydrating tube is covered with a casing having a exhaust drain port, and a suction blower is communicated with the exhaust drain port.

Further, in any one of the aforementioned compositions, the rotation speed of the net of an evaporation means may be adjustable.

Besides, in any one of the aforementioned compositions, respective processing means may be connected so that the polished rice inlet of a processing means of the following process side is positioned under the polished rice outlet of a processing means of the previous process side, thereby allowing the polished rice to pass sequentially respective processing means, without providing a transport means between respective processing means.

And further, in any one of the aforementioned compositions, a driving control means for controlling the operation of pressure rice washing means, rinsing dehydrating means, moisture adjustment means and rice washing intensity adjustment means may be provided so that the operation of said respective means is executed based on data concerning the polished rice input to the control means.

And, in any one of said compositions, a rice washing intensity adjustment means may comprise a rice washing pressure adjustment means and a washing water flow adjustment means in said rice washing means.

Besides, the present invention provides a non-washing rice manufacture method, comprising steps of:

washing polished rice in an agitation tube having therein an agitation roll, disposed rotationally drivable, provided with a projecting rib on the peripheral surface rinsing the polished rice passed through the rise washing process to dehydrating attached moisture, and next, drying the polished rice to set the moisture content to a predetermined value, wherein:

said step of washing polished rice comprises a feed step for transporting the polished rice from the inlet of the agitation tube to the inside, a polishing step for washing the polished rice and a rough rinsing step washing with water the polished rice from the polishing step and, at the same time, said polished rice washing step is so composed to wash the rice by adjusting the rise washing pressure, the rotation speed of the agitation roll and the washing water supply amount, according conditions presented by the polished rice.

In addition, said manufacture method may be composed to adjust the rise washing pressure, the rotation speed of the agitation roll and the washing water supply amount based on the data concerning the polished rice input to said control means.

DETAILED DESCRIPTION OF THE PREFERRED EMBODIMENTS

Figure 1:
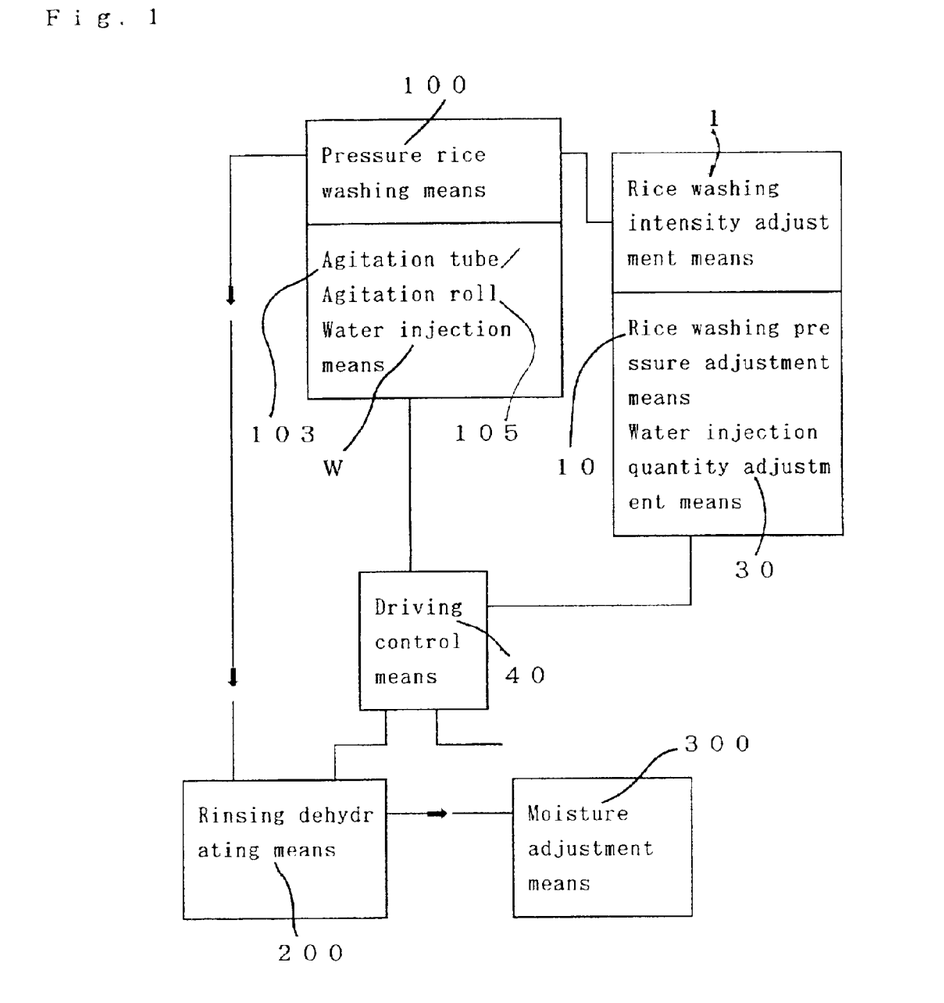
FIG. 1 is a general outline composition diagram of a non-washing rice manufacture apparatus according to 1 embodiment of the present invention.

FIG. 1 is a general outline composition diagram of non-washing rice manufacture according to 1 embodiment of the present invention.

In the drawing, 100 is a pressure rice washing means and comprises an agitation tube 103 for polished rice, an agitation roll 105 installed in this agitation tube 103 and rotated, and having a helical projecting rib on the peripheral surface in order to agitate and wash polished rice with water, and a plurality of water injection means W for supplying washing water of polished rice in said agitation tube 103.

Besides, in the drawing, 1 is a rice washing intensity adjustment means for controlling as will the rice washing intensity in the pressure rice washing step in accordance to the conditions that the polished rice presents, in short, rice quality, kind, moisture content, polishing degree, age after the harvest, or others, and comprises a rice washing pressure adjustment means 10 and a water injection quantity adjustment means 30 for adjusting the supply quantity of washing water into the agitation tube. It should be noted that usually the rice washing intensity adjustment means is sufficiently composed only of a rice washing pressure adjustment means 10, and the water injection quantity adjustment means 30 can be provided in case of adjusting the rice washing intensity more precisely.

Further, 200 is a rinsing dehydrating means for removing water adhered to the polished rice passed through the pressure rice washing process, and 300 is a moisture adjustment means for drying polished rice passed through rinsing dehydrating and adjusting the moisture content thereof to a predetermined value. And, 40 is a computer as driving control means for controlling the operation of pressure rice washing means, rinsing dehydrating means, and controls the operation of said respective means based on the data concerning the polished rice.

Figure 2:
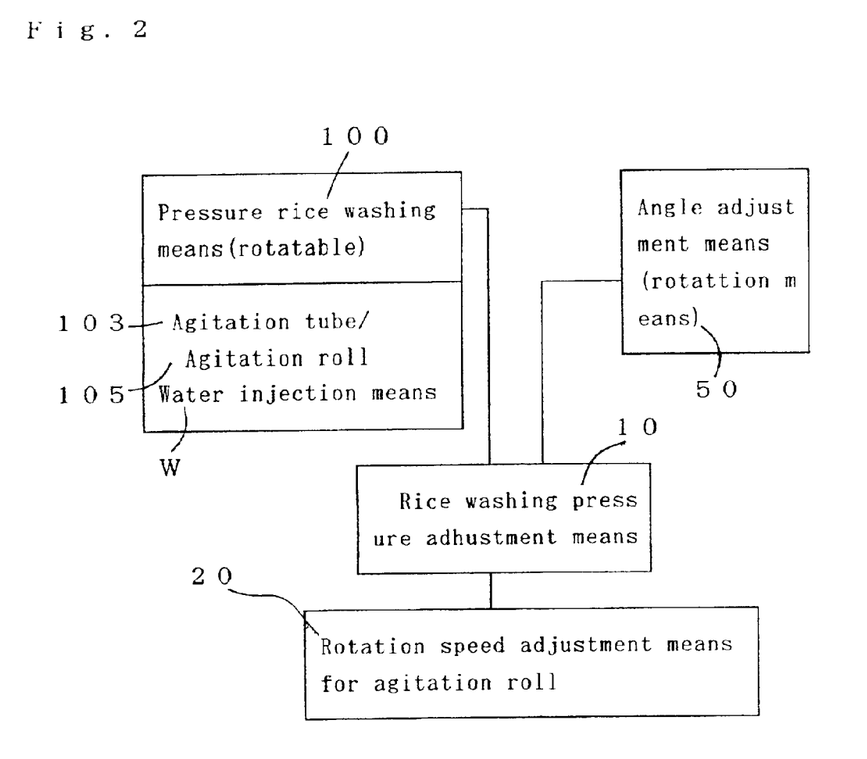
FIG. 2 is a general outline composition diagram of a rice washing pressure adjustment means according to 1 embodiment of the present invention.

FIG. 2 is a composition diagram of said rice washing pressure adjustment means 10, composed of a pressure rice washing means 100 whose inclination angle in the axial direction of said agitation tube 103 can be set as will, an angle adjustment means 50 for rotation setting this pressure rice washing means to a predetermined inclination angle according to the condition that the polished rice presents and an rotation speed adjustment means 20 for adjusting the rotation speed of the agitation roll 105.

The pressure rice washing means 100 is composed rotatable taking a predetermined position as a fulcrum, rotated by said angle adjustment means 50 and set to a predetermined inclination angle according to the condition that the polished rice presents. This angle adjustment means 50 can use, for example, a well-known actuator such as stepping motor, hydraulic cylinder, electromagnetic solenoid, or others, and is coupled with the pressure rice washing means 100 by means of a well-known power transmission means such as gear mechanism or others.

It should be appreciated that though the pressure rice washing means 100 per se is composed to be rotatable, only the agitation tube 103 may be rotated.

By the way, in FIG. 1, the polished rice input continuously into the agitation tube 103 from a (not shown) hopper in the pressure rice washing means 100, is mixed with washing water supplied from the water injection means W and air in the agitation tube 103, and washed while proceeding toward the exit of the agitation tube 103 all the way being agitated by the agitation roll 105 in this mixture state.

The polished rice having passed the pressure rice washing step is transported to a rinsing dehydrating means 200 as shown by an arrow of FIG. 1, rinsed and dehydrated and, thereafter, transported to a moisture adjustment means 300 and dried so that the moisture content becomes a predetermined value. The dehydrating means 200 and the moisture adjustment means 300 shall be described in detail below.

In the embodiment, the helical projecting rib formed on the peripheral surface of the agitation roll 105 is made of a polished rice feed section, a rice washing section and a polished rice carrying-out section, the pitch of the helical projecting rib of said respective section is smaller in the feed section than in the rice washing section, and larger in the carrying-out section than in the rice washing section. On the other hand, the water injection means W for supplying the agitation tube 103 with washing water is provided at three points around the peripheral surface of the agitation tube 103, and respective water injection means are placed at the position corresponding to said feed section, rice washing section and carrying-out section.

The polished rice input into the agitation tube 103 arrives at the rice washing section through said feed section.

In this rice washing section, washing water from the water injection means is supplied into the agitation tube 103 and the agitation and mixing of polished rice and water is executed entraining air. The polished rice is pressed on to the inner peripheral surface of the agitation tube 103 by centrifugal force by the revolution of the agitation roll and washed with rice grains in strong contact each other.

Consequently, the pressure to the polished rice decreased if the rotation speed of the agitation roll 105 is reduced and, on the contrary, the pressure to the polished rice increases if the rotation speed of the agitation roll 105 is increased.

Besides, the pressure in the polished rice is also related to the quantity of washing water to be supplied. In short, if the washing water is abundant, the mutual contact pressure of rice grains is lowered because of water film interposed between rice grains. On the contrary, if the quantity of washing water is low, the mutual contact pressure of rice grains increases, because the water film interposed between rice grains becomes thinner.

This embodiment intends to adjust the rice washing intensity, by controlling the pressure to rice grains in the rice washing process, and the pressure adjustment is executed, by regulating the rotation speed of the agitation roll 105, and rotating the pressure rice washing means 100 by said angle adjustment means 50, to a predetermined inclination angle corresponding to the conditions of the polished rice.

Independently of the angle to be set, in the angle adjustment of the pressure rice washing means 100 and the agitation tube 103, the pressure rice washing means 100 or the agitation tube 103 is rotated so that the polished rice inlet side comes to a lover lever than the polished rice exit side.

By inclining the pressure rice washing means 100 or the agitation tube 103, a force to the polished rice inlet is always applied to the polished rice in the agitation tube 103, the polished rice is pushed to the exit direction by the rotation of the agitation roll 10 against said action force, generating a predetermined pressure in the polished rice. And, this pressure increases/decreases according to the magnitude of the inclination angle of the pressure rice washing means 100 or the agitation tube 103. Consequently, in case of long-stored rice or when an intense washing is required, it will be enough to increase the inclination angle and, at the same time, to increase the rotation speed of the agitation roll 10. On the contrary, the inclination angle is reduced and the rotation speed of the agitation roll 10 is reduced, to lower the rice washing intensity.

Now, the polished rice is washed before cooking, in order to remove bran layer adhered to the rice surface when brown rice is polished. By the way, as the nature of this bran layer is different according to the rice to be washed, a delicious polished rice can be obtained only when the rice washing intensity is adjusted according to the state of this rice. In short, for example, in case of new rice, as the bran layer has hardened little, if washed with an intensity superior to a predetermined one, not only the bran layer but also the taste proper to the rice will be removed. On the contrary, in case of long-stored rice or the like, if the washing intensity is low, bran layer remains even after the washing, and sometimes it smells bran strongly even after cooking, and can not be served as food.

In other words, a delicious polished rice can not be obtained, if all kinds of rice are processed by an identical washing intensity.

In this embodiment, the rice is classified into 5 degrees for respective conditions of (a) breed, (b) moisture content, (c) temperature (atmospheric temperature, temperature of washing water, rice temperature), (d) application field, and (e) rice conservation state, and rice washing data is input into the computer as control means based on these categories, for controlling the operation of the pressure rice washing means 100.

Namely, said classification is made as follows.
(a) breed
   Category Breed of rice
     1 Kiraka, Yumenohoshi
     2 Tsugaru Roman, Tsugaru Otome
     3 Tsukino Hikari, Yumeakari
     4 Kosihikari made in Australia, Akita Komachi, Hinhikari
     5 Koshihikari, Haenuki, Hitomebore
(b) moisture content of rice
   Category Moisture content
     1 around 13%
     2 around 13.5%
     3 around 14%
     4 around 14.5%
     5 around 15%
(c) temperature (sum of atmospheric temperature, temperature of washing water and rice temperature)
   Category Total sum of temperature
     1 lower than 30 degrees Celsius
     2 equal or superior to 30 degrees Celsius and lower than 45 degrees Celsius
     3 equal or superior to 45 degrees Celsius and lower than 55 degrees Celsius
     4 equal or superior to 55 degrees Celsius and lower than 65 degrees Celsius
     5 equal or superior to 65 degrees Celsius
(d) application field
   Category Application
     1 home use in urban area
     2 packed lunch maker
     3 sushi use
     4 business use in regional town
     5 home use in non-urban area
(e) rice conservation state
   Category Conservation state
     1 conserved for 20 months or more at normal temperature
     2 conserved for 10 months or more at normal temperature
     3 conserved for 20 months or more at low temperature
     4 conserved for 10 months or more at low temperature
     5 conserved for less than 10 months at low temperature In the foregoing, the degree of rice washing is reduced in the order from 1 to 5. There, suppose the sum of categories in the aforementioned respective conditions be the rice washing coefficient, its minimum value is 5, and its maximum value is 25, and the number of rice washing coefficient in the range results in 26 kinds. In case of rice washing coefficient 5, it is necessary to wash with the maximum intensity, and incase when the rice washing coefficient indicates 25, it will be enough to wash with the minimum intensity. There, if 26 kinds of rice washing intensity in the pressure rice washing means 100 can be set, the most appropriate pressure rice washing can be executed for almost all breeds of rice. In short, the farmware of the computer has the rice washing intensity corresponding to respective rice washing coefficients from 5 to 25, more particularly, the inclination of the agitation tube 103, the rotation speed of the agitation roll 105 are input and set previously, and if a concrete rice washing coefficient is input, the non-washing rice manufacture apparatus shall be operated with the inclination and rotation speed corresponding to that numeric value.

In the embodiment, said 26 kinds of rice washing operation are set beforehand in the computer farmware as control means 40. There, in the actual rice washing operation, in case when said rice washing coefficient is 12 for example, a predetermined signal in input into the control means so as to select a rice washing intensity corresponding to 12, the control means operates the pressure rice washing means to wash rice with an intensity corresponding to 12.

Figure 3:
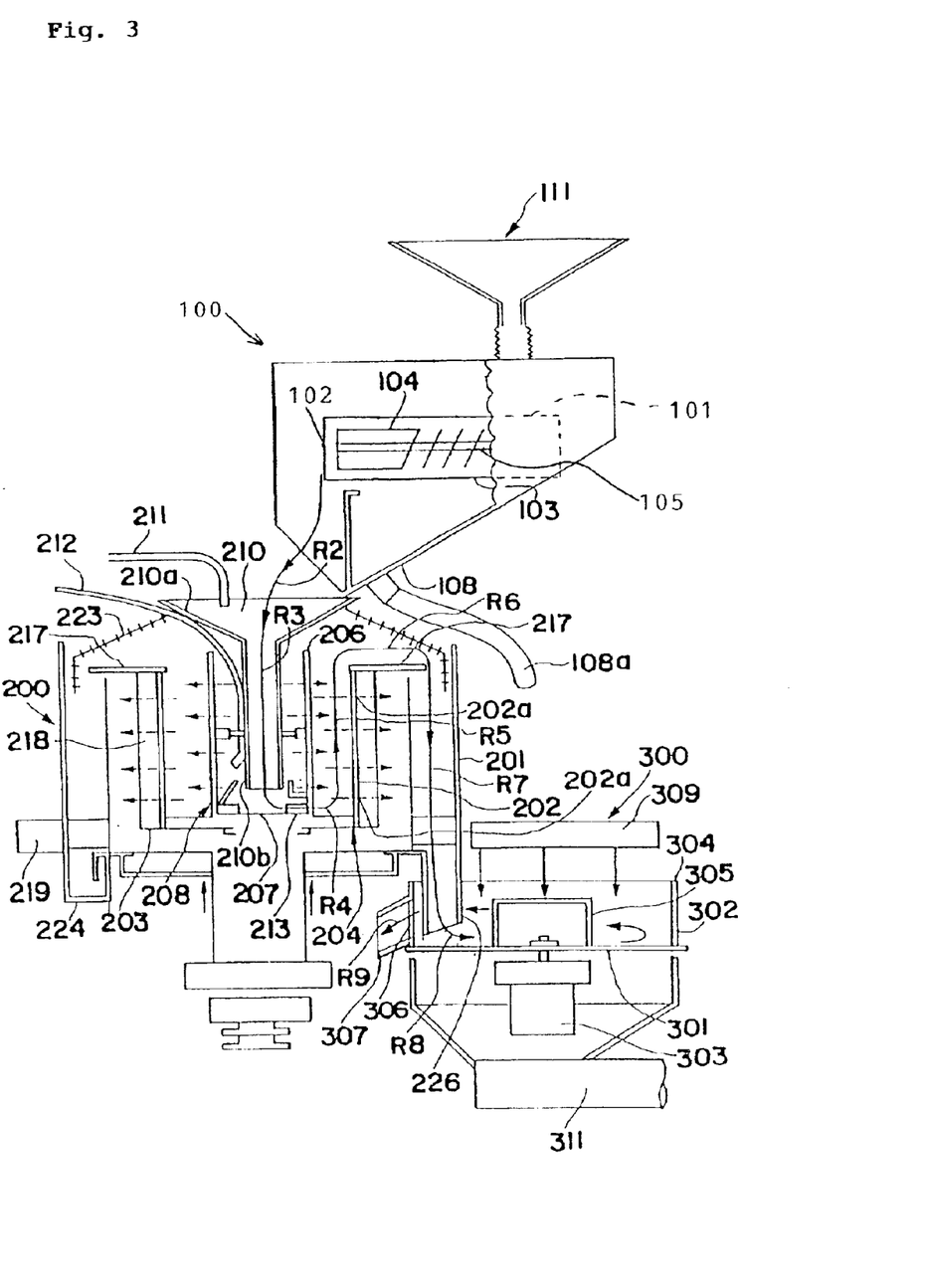
FIG. 3 is a general outline composition diagram of a non-washing rice manufacture apparatus according to 1 example of the present invention.

FIG. 3 is a general outline composition diagram showing 1 example of the non-washing rice manufacture according to FIG. 1, comprising a pressure rice washing means 100 for washing the polished rice by intermediate of water and air, a rinsing dehydrating means 200 for removing water adhered to the polished rice passed through the pressure rice washing process, a moisture adjustment means 300 for drying polished rice passed through rinsing dehydrating and adjusting the moisture content thereof to a predetermined value, and a rice washing intensity adjustment means A for controlling as will the rice washing intensity in the pressure rice washing step in accordance to the conditions that the polished rice presents.

In the drawing, 100 is a pressure rice washing means 100, and an agitation roll 105 including a helical projecting rib 104 on the peripheral surface is fit into a hexagonal cylindrical agitation tube 103 having a polished rice inlet 101 at one end and an outlet 102 at the other end, and this agitation roll 105 is driven by an electric motor (not shown). The agitation tube 103 is provided with a water tank (not shown). The agitation tube 103 is provided with a water injection means communication with a water tank (not shown) or the like, and a drain section made of a hole so small as not to let polished rice leak under the agitation tube 103, and further, a water receiving gutter 108 id provided thereunder.

As mentioned above (FIG. 2), the pressure rice washing means 100 includes a rice washing pressure adjustment means 10, but not shown in FIG. 3, in order to avoid complexity. This rice washing pressure adjustment means 10 is composed of a pressure rice washing means 100 that can set as will the inclination angle of said agitation tube 103 in the axial direction, an angle adjustment means 50 for rotation setting this pressure rice washing means 100 to a predetermined inclination angle according to the condition that the polished rice presents, and an rotation speed adjustment means 20 for adjusting the rotation speed of the agitation roll 105.

In short, the pressure rice washing means 100 is composed rotatable taking a predetermined position as a fulcrum, rotated by said angle adjustment means 50 and set to a predetermined inclination angle according to the condition that the polished rice presents. This angle adjustment means 50 can use, for example, a well-known actuator such as stepping motor, hydraulic cylinder, electromagnetic solenoid, or others, and is coupled with the pressure rice washing means 100 by means of a well-known power transmission means such as gear mechanism or others.

It should be appreciated that, in this example, though the pressure rice washing means 100 per se is composed to be rotatable, only the agitation tube 103 may be rotated.

Also, the rotation speed adjustment means 20 for adjusting the rotation speed of the agitation roll 105, is composed of a driving electric motor of the agitation roll 105 and a thyristor conversion apparatus that can be attached thereto, allowing to control precisely the rotation speed of the agitation roll 105.

Figure 4:
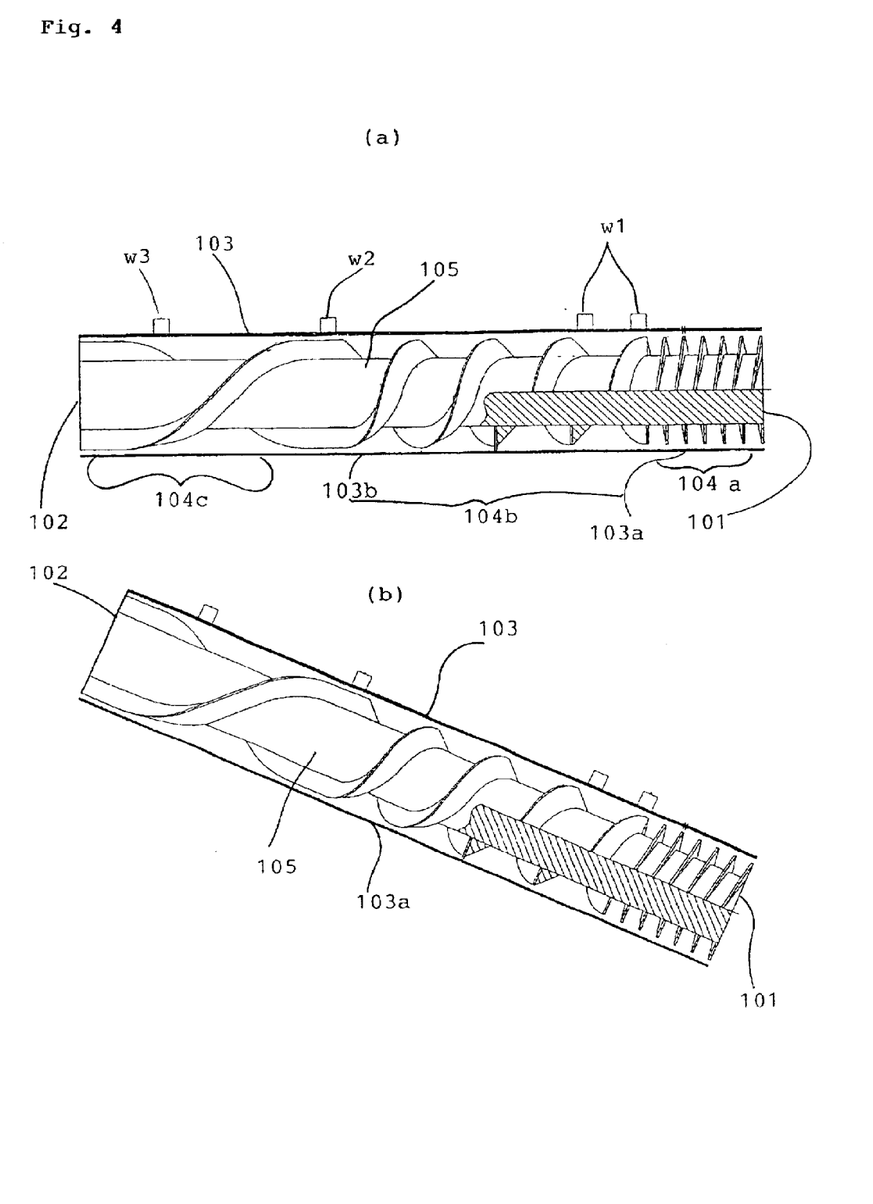
FIG. 4 is a side view showing 1 example of the agitation roll.

FIG. 4 shows 1 example of the agitation roll 105 to be fitted in the essential part of the pressure rice washing means 100, in short the agitation tube 103.

In FIG. 4(*a*), the helical projecting rib 104 formed on the peripheral surface of the agitation roll 105 is made of a polished rice feed section 104*a*, a rice washing section 104*b* and a polished rice carrying-out section 104*c*, the pitch of the helical projecting rib of said respective section being smaller in the feed section 104*a* than in the rice washing section 104*b*, and larger in the carrying-out section 104*c* than in the rice washing section 104*b*.

On the other hand, the water injection means W for supplying the agitation tube 103 with washing water is provided at three points around the peripheral surface of the agitation tube 103, and respective water injection means W1, W2, W3 are placed at the position corresponding to said feed section 104*a*, rice washing section 104*b* and carrying-out section 104*c*.

Moreover, 103*a* is a first drain section provided at the position corresponding to said feed section 104*a* on the lower peripheral surface of said agitation tube 103, while 103*b* is a second drain section provided similarly at the position corresponding to said rice washing section 104*b* and carrying-out section 104*c*, and made of a number of small holes.

As mentioned above, thought the agitation tube 103 is rotated by said angle adjustment means 50, allowing to be set to a predetermined inclination angle corresponding to the condition of the polished rice, The angle adjustment of the pressure rice washing means 100 or the agitation tube 103 by the angle adjustment means 50, independently of the angle to be set, rotates the pressure rice washing means 100 or the agitation tube 103 so that the polished rice inlet 101 side comes to a position lower than the polished rice outlet 102 side as shown in FIG. 4(*b*).

The inclination angle of the pressure rice washing means 100 or the agitation tube 103 can be set in a range of 0 to 90 degrees; however, from a practical point of view, in this example, the inclination angle can be selected in a range from 20 to 50 degrees.

It should be appreciated that the inclination angle of the pressure rice washing means 100 or the agitation tube 103, and the rotation speed of the agitation roll 105 are set automatically according to the polished rice data to be input in the control means; however, they can also be set manually by canceling this automatic control.

Figure 5:
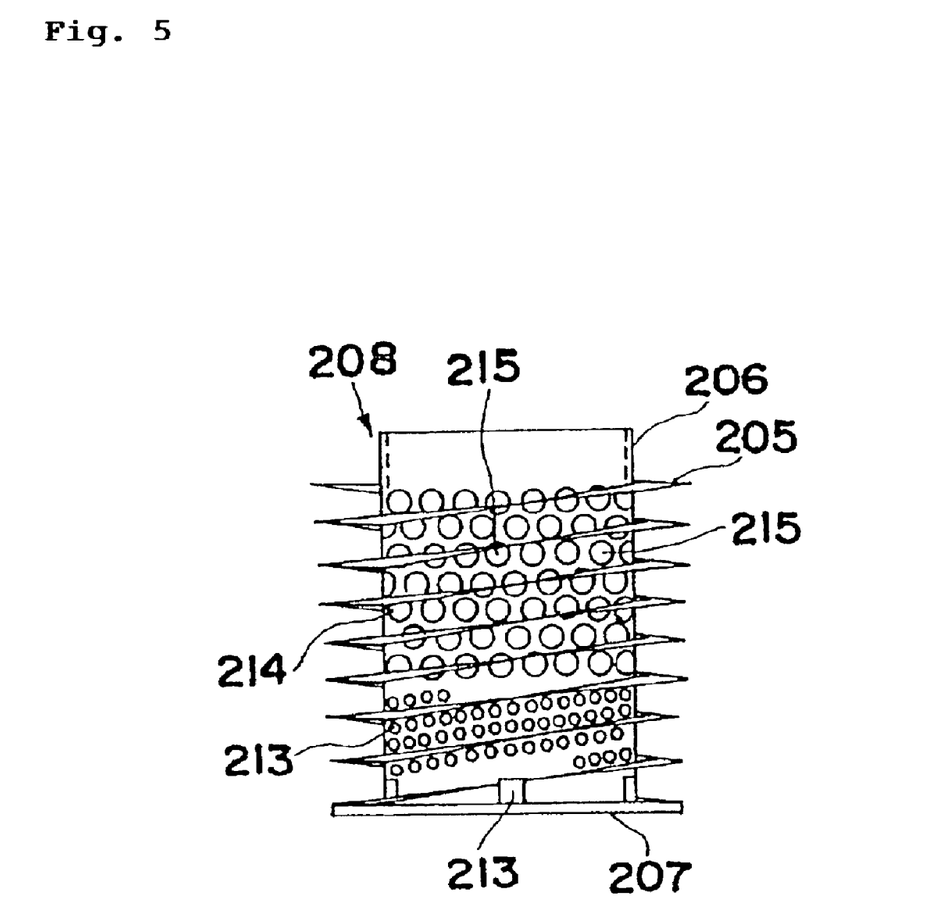
FIG. 5 is a front view showing 1 example of the screw tube of the rinsing dehydrating means.

As shown in FIG. 3, the rinsing dehydrating means 200 has a centrifugal dehydrating tube 204 made of a porous peripheral wall 202 where holes 202*a* so small as not to let polished rice leak are opened and a bottom plate 203, in a casing 201 with an open top, and a screw tube 208 made of a peripheral wall 206 having concentric screw blades 205 (refer to FIG. 5) outside and a bottom plate 207, in the centrifugal dehydrating tube 204, and this screw tube 208 and the centrifugal dehydrating tube 204 can rotate independently each other, and moreover, the screw tube 208 shall rotate somewhat faster that the centrifugal dehydrating tube 204.

Figure 6:
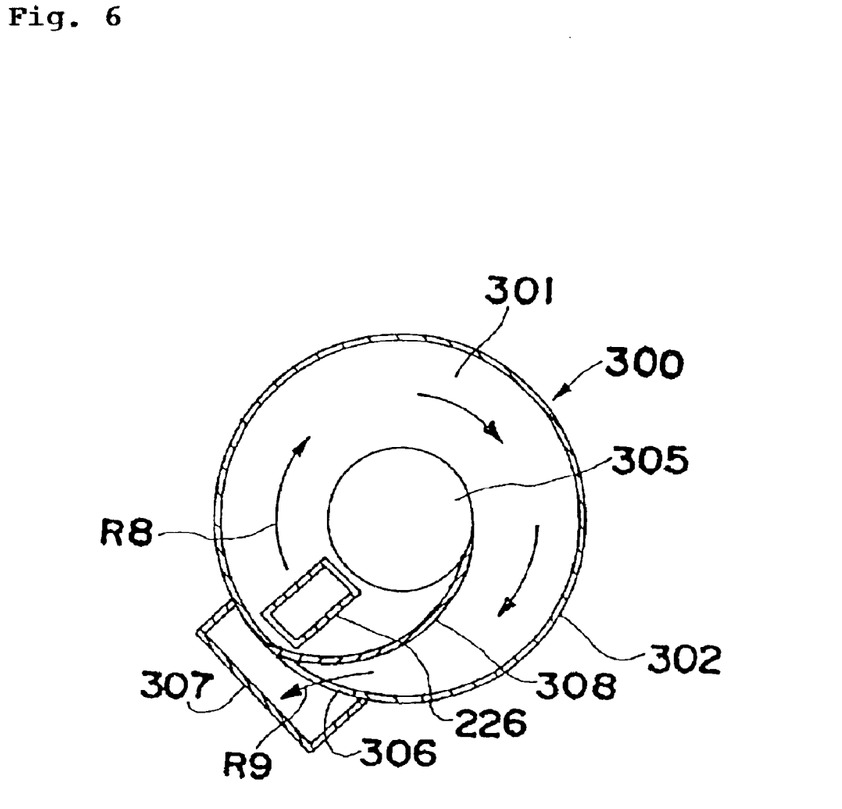
FIG. 6 is a plan showing 1 example of moisture adjustment means.

Moreover, a rice and water reception tube 210 made of a hopper 210*a* and a tubular section 210*b* formed integrally thereunder is provided facing the washed rice exit of the pressure rice washing means 100, and the tubular section 210*b* of said reception tube 210 extends coaxially with the screw tube 208 to the proximity of the inside bottom section. A second washing water supply pipe 211 is arranged by introducing into the rice and water reception tube 210 and, a rinse water supply pipe 212 is arranged at the outer periphery side of the rice and water reception tube 210. As shown in FIG. 6, a rice and water outlet 213 and rinse water outlet 214 are disposed in this order from the bottom, and further, a draft 215 is provided at the upper side of the rinse water outlet 214.

A flange section 217 is disposed at the upper end of the peripheral wall 202 of the centrifugal dehydrating tube 204, a plurality of wind generating blades 218 held by the flange section 217 and the bottom plate 203 at both ends are provided, and an exhaust and drain port 219 is provided at the lower part of the peripheral wall of the casing, allowing to take wind from the top end of the screw tube 208 according to the rotation of the wind generating blades 218, in a way to generate a wind flow passing through the draft 215 of the screw tube 208 and a small hole 202*a* of the centrifugal dehydrating tube, and going out from the exhaust and drain port 219.

This wind flow is as shown by a number of arrows in FIG. 3. The exhaust and drain port 219 is connected to a not shown exhaust and drain pipe.

Further, a net 223 is set on the top face of the casing 201, a collection gutter 224 is formed at the lower end, and an outlet is proved on the collection gutter 224 for attaching an outlet pipe 226. The moisture content of the polished rice discharged from this outlet 226 is measured by a well-know moisture meter to obtain 17 to 18%.

Further, in FIG. 3, the moisture adjustment means 300 has a disk shape net 301 reinforced at the lower face against deformation, and rotation drivable by an electric motor 303 fitted in a casing 302, the outer periphery section and the middle section of the net 301 are covered respectively with an outer periphery cover 304 and an inner periphery cover 305 so as to prevent polished rice on the net 301 from falling, and a part of the casing 302 and the outer peripheral cover 304 is notched so as to be flash with the net 301 and to form an outlet 306, a discharge shoot 307 is attached to this outlet 306, and the polished rice is guided to the outlet 306 by the rotation of the net 301.

In addition, a heater 309 to supply hot wind on the net is provided on the top face side of the net 301, and an air suction port 311 communicating with a suction blow (not shown) for applying downward suction force to the hot wind of the heater 309 and the polished rice on the net 301 is provided at the top face side of the net 301.

Moreover, as shown in FIG. 6, the polished rice discharged on the net 301 from the outlet pipe 226 of the rinsing dehydrating means 200 is turned by one revolution as shown by an arrow by the rotation of the net 301, a guide plate 308 is provided at the terminal end position of this one revolution, the polished rice is guided to the outlet 306 by said guide plate 308, and discharged from the discharge shoot 307.

And, the moisture content of the polished rice discharged from this discharge shoot 307 of this moisture adjustment means 300 is measured by a well-know moisture meter to obtain 13.0 to 14.5%.

Now, the function of the non-washing rice apparatus according to the example will be described, based on the aforementioned composition.

First, data of polished rice to be washed is input into a computer as control means 40. Said data are numeric values in the list described in the paragraph 40.

In short, the rice washing degree coefficient of the polished rice to be washed is calculated from the data table wherein the rice is classified into 5 degrees respectively for 5 items of rice (a) breed, (b) moisture content, (c) temperature (atmospheric temperature, temperature of washing water, rice temperature), (d) application field, and (e) rice conservation state, and the numeric value thereof is input into the computer as control means 40. The farmware of the computer has the inclination of the agitation tube 103 and the rotation speed of the agitation roll 105 corresponding to respective numeric values of 5 to 25 are input previously, and for example, if a rice washing coefficient 5 is input, the control means controls the driving of the non-washing rice manufacture apparatus with the inclination of the agitation tube 103 and the rotation speed of the agitation roll 105 corresponding to corresponding to this coefficient.

In case of rice washing coefficient 5, it is necessary to wash with the maximum intensity. Consequently, when this value 5 is input into the control means, the inclination angle of the pressure rice washing means 100 or the agitation tube 103 is set automatically to around 50 degrees and, on the other hand, the rotation speed of the agitation roll 105 is set to high revolution, polished rice is input from the polished rice input means 111 to the pressure rice washing means 100 and the rice washing operation starts.

The polished rice moves in the order of the polished rice feed section 104a of the agitation roll 105, the rice washing section 104b and the polished rice carrying-out section 104c, in the agitation tube 103, and as the agitation tube 103 or others and inclined with the polished rice inlet 101 downward as shown in FIG. 4(b), the polished rice tends to shift to the right downward or to the entrance direction in the agitation tube 103 under the effect of gravity. On the other hand, the revolution of the agitation roll 105 presses the polished rice to the exit direction of the agitation tube 103. At this time, a large contact pressure is generated among rice grains each other, making the rice washing intensity maximum.

Moreover, when the rice washing starts, washing water supplied from the water injection means W1, W2, W3 into the agitation tube 103, runs into the polished rice against the polished rice progress direction generating a pressure. This washing water is drained from a first drain section 103a and a second drain section 103b. It should be appreciated that the drain from the first drain section 103a is difficult to recycle without treatment because it is heavily polluted, while the drain from the second drain section 103b is easy to recycle without treatment because it is hardly polluted. In short, the drain from the second drain section 103b is nothing but a simple rinse water of the polished rice washed in the rice washing section 104b (washing water is already drained from the first drain section 103a. In this example, the drain from the second drain section 103b and the drain from the rinsing dehydrating means 200 is returned to the water injection means W1 and recycled.

Now, if rice is washed in the agitation tube 103 made to have a large inclination angle as mentioned above, in a state where the rotation speed of agitation roll 105 is increased, the pressure applied to the rice grain increased and the rice washing intensity increases. Moreover, the increase of the rice washing intensity is also dependent on the water quantity in the agitation tube 103. In the agitation tube 103 of which inclination angle is increased, the washing water remains for a shorter period of time, and the quantity of water interposed among rice grains reduces, increasing the contact pressure among rice grains.

If the rice washing coefficient is, for example, 25, contrary to the foregoing, it is necessary to wash with the minimum intensity. Similarly as before, if the rice washing degree coefficient 25 is input into the control means, the computer as control means starts to operate the apparatus with the inclination angle of the agitation tube 103 and the rotation speed of the agitation roll 105 set previously in correspondence to the rice washing coefficient 25.

In the example, the inclination angle of the agitation tube 103 with the rice washing coefficient 25 is set to approximately around 20 degrees. Moreover, the rotation speed of the agitation roll 105 is also set inverse proportion to the rice washing coefficient of the time when the rice washing intensity if maximum mentioned above. Consequently, the rotation speed of the agitation roll 105 is ⅕. The reduction of the inclination angle of the agitation tube 103 and the rotation speed of the agitation roll 105 makes the pressure to the polished rice during the rice washing appropriate to the condition of this polished rice.

The polished rice passed through the pressure rice washing process is discharged from the outlet 102 with a small quantity of water, and these washing water and polished rice are input into the rice and water reception tube 210 of the rinsing dehydrating means 200. It should be appreciated that, in the example, the time of contact between the polished rice and the washing water to the discharge from the outlet is about 2.6 sec or shorter, and the polished rice strength does not lower within such a short time, allowing to isolate effectively ariulone residue, by rubbing the surface of polished rice, applying a relatively high pressure.

A group of rice grains (polished rice) and washing water exiting from the pressure rice washing means 100 are transported to the rinsing dehydrating means 200 as shown by an arrow R2 in FIG. 3. In short, polished rice and water discharged from the outlet 102 of the agitation tube 103 fall into the rice and water reception tube 210 composed of a hopper 210a and a tubular section 210 as shown by the arrow R2 to R3, and about 1.2 to 2.0 litters of secondary washing water from the second washing water supply pipe 211 are poured thereon.

These polished rice and washing water fall in the tubular section 210b and arrive at the bottom 207 of a screw tube 208, move in the radial direction as shown by an arrow R4, by the centrifugal force according to the revolution of this screw tube 208, and both exit from the rice and water outlet 214 and enter the centrifugal dehydrating tube 204, are applied to the peripheral wall 202 by the centrifugal force according to the revolution of the centrifugal dehydrating tube 204, and washing water among them is drained from a small hole 202a as shown by a number of arrows.

Thus drained polished rice is transported upward axially along the peripheral wall 202 as shown by the arrow R5, and dehydrated, by the screw blade 205 of the screw tube 208 differentially rotating with the centrifugal dehydrating tube 204, but water is added on the way. In short, rinse water of the quantity of ¼ to ½ times of the polished rice weight, for example, about 0.8 to 1.5 litter is poured.

Rinse water supplied from the rinse water supply pipe 212 into the screw tube 208 is pressed to the inner face of the peripheral wall 206 and extends in water film shape by the centrifugal force, and this rinse water is discharged from respective water discharge port 214, 214, . . . and poured in shower onto the polished rise as shown by a number of arrows.

As water is injected at the same time as centrifugal dehydrating, the rinse water containing a high concentration of ariulone residue remaining as adhered water on the polished rice surface is replaced effectively with rinse water, and the concentration of ariulone residue of the adhered water can be reduced sufficiently.

It should be noted that secondary washing water and rinsing water containing ariulone residue are discharged outside as drain of 1000 to 2000 ppm from the outlet 219. After the injection of rinse water, the polished rice is centrifugally dehydrated while being transported upward. Here, as the centrifugal dehydrating is assisted by a wind from the draft port 215 to the small hole 202a passing through the polished rice, a rapid dehydrating can be realized without increasing the centrifugal force excessively, preventing the polished rice being damaged by the centrifugal force.

There, at the time point when the polished rice attains the upper end of the centrifugal dehydrating tube as shown by the arrow R6, the adhere water becomes 2 to 3 weight % of the polished rice, and the staying time in the rinsing dehydrating means 220 is about 14 sec.

The polished rice exiting from the upper end of said centrifugal dehydrating tube 204 is born radially by the centrifugal force, passes through a space 221 and falls in a collection gutter 224 as shown by the arrow R7, passes from the outlet 225 top the discharge pipe 226, and is input in a casing 302 of the moisture adjustment means 300 as shown by the arrow R8. The moisture content of the polished rice immediately after discharged from this outlet 226 is measured by a moisture meter to obtain 17 to 18%. The polished rice input into the casing 302 is deployed sequentially over the rotating net 301, transported while receiving hot wind of a heater 309 from upward, and the adhered water is evaporated by a hot wind blowing through the net 301 from top downward sucked by a suction blower 311, and at this time point, the weight of adhered water is so low as 2 to 3% of the polished rice, and water adheres evenly all over the polished rice, so the wind flows equally through respective mutual interstices of the polished rice, without producing an irregular drying.

In addition, here the polished rice per se is not transported but moved by the net 301, the cell structure of the polished rice surface weakened by water absorption is not damaged.

The polished rice whose adhered water is evaporated almost completely is discharged as finished product from the outlet 306 passing through the discharge shoot 307 as shown by the arrow R9.

The stay time in this moisture adjustment means 300 is about 27 sec, and the temperature of the wind to be blown is the atmospheric temperature (Celsius) of that time +5 degrees. The moisture content of the polished rice exiting from this discharge shoot 307 is measured by a moisture meter to obtain 13.0 to 14.5%.

In other words, the time from input of polished rice into the hopper 111 a to the exit from the discharge shoot 307 as product passing through the moisture adjustment means 300 is 45 sec to 100 sec according to the nature of rice or the season. Besides, the moisture content of polished rice as final product is finished to be around +/−0.3% of the initially input polished rice, and finished to a moisture content slightly lower than the moisture content of the initial polished rice, for example to a moisture content of 14.5.

The non-washing rice manufacture apparatus according to the present invention can wash the rice with a rice washing intensity corresponding to the polished rice to be washed, by the composition and function mentioned above, allowing to manufacture a non-washing rice presenting an excellent taste and a long shelf life.

| DESCRIPTION OF SYMBOLS | |
|---|---|
| 1 | rice washing intensity adjustment means |
| 10 | rice washing pressure adjustment means |
| 20 | rotation speed adjustment means |
| 30 | washing water quantity adjustment means |
| 40 | control means |
| 100 | pressure rice washing means |
| 103 | agitation tube |
| 105 | agitation roll |
| 200 | rinsing dehydrating means |
| 300 | moisture adjustment means |

What is claimed is:

1. A non-washing rice manufacture apparatus, comprising:

a pressure rice washing means for washing polished rice through intermediate of water and air, a rinsing dehydrating means for removing water adhered to the polished rice passed through the pressure rice washing process, a moisture adjustment means for drying polished rice passed through rinsing dehydrating to adjust the moisture content thereof to a predetermined value, and a rice washing intensity adjustment means for controlling as desired the intensity of rice washing in the pressure rice washing process according to the conditions that the polished rice presents; wherein:

said pressure rice washing means has a plurality of water injection means for supplying polished rice with washing water, and an agitation roll provided with a helical projecting rib on the peripheral surface is disposed rotationally drivable in an agitation tube having an inlet of polished rice at one end and an outlet at the other end;

said rinsing dehydrating means is formed by disposing in a rotationally drivable manner a centrifugal dehydrating tube provided with a porous peripheral wall, disposing a screw tube inside the centrifugal dehydrating tube coaxially with the centrifugal dehydrating tube and differentially and rotationally drivable with the centrifugal dehydrating tube, pushing a rice supply pipe for supplying in the screw tube with polished rice from the pressure rice washing means through the screw tube, and providing a rice discharge port for discharging polished rice supplied from a rice supply pipe toward the peripheral wall of the centrifugal dehydrating tube, a screw blade for moving axially polished rice discharged from the rice discharge port in the axial direction along the peripheral wall of the centrifugal dehydrating tube, and a rinse water discharge port for discharging rinse water toward the polished rice moved by the screw blade;

said moisture adjustment means comprises a net disposed rotationally drivable for deploying polished rice from the rinsing dehydrating means over the top face thereof, and a suction blower for sucking air from under the net; and the rice washing intensity adjustment means is composed of a rice washing pressure adjustment means for controlling as desired the pressure to the polished rice in said pressure rice washing means.

2. The non-washing rice manufacture apparatus of claim 1, wherein:

said rice washing intensity adjustment means is composed of a pressure rice washing means whose inclination angle in the axial direction of the agitation tube can be set as will, an angle adjustment means for setting said pressure rice washing means to a desired inclination angle, and a rotation speed adjustment means of the agitation roll.

3. The non-washing rice manufacture apparatus of claim 1, wherein:

said helical projecting rib formed on the peripheral surface of the agitation roll comprises a polished rice feed section, a rice washing section and a polished rice carrying-out section, the pitch of the helical projecting rib of said respective section is smaller in the feed section than that in the rice washing section, and larger in the carrying-out section than that in the rice washing section, and a drain section having a number of small holes is provided at points corresponding to said rice washing section and carrying-out section on the peripheral surface of the agitation tube.

4. The non-washing rice manufacture apparatus of claim 1, wherein:

a draft is disposed upper than the rinse water discharge port of the screw tube peripheral wall, and a wind generating blade rotating integrally with the centrifugal dehydrating tube is disposed outside the centrifugal dehydrating tube peripheral wall.

5. The non-washing rice manufacture apparatus of claim 1, wherein:

the draft is disposed upper than the rinse water discharge port of the screw tube peripheral wall, the surrounding of the centrifugal dehydrating tube is covered with a casing having a exhaust drain port, and a suction blower is communicated with the exhaust drain port.

6. The non-washing rice manufacture apparatus of claim 1, wherein:

the rotation speed of the net of an evaporation means is made adjustable.

7. The non-washing rice manufacture apparatus of claim 1, wherein:

respective processing means are connected so that the polished rice inlet of a processing means of the following process side is positioned under the polished rice outlet of a processing means of the previous process side, thereby allowing the polished rice to pass sequentially respective processing means, without providing a transport means between respective processing means.

8. The non-washing rice manufacture apparatus of claim 1, comprising:

a driving control means for controlling the operation of pressure rice washing means, rinsing dehydrating means, moisture adjustment means and rice washing intensity adjustment means, wherein the operation of said respective means is executed based on data concerning the polished rice input to the control mean.

* * * * *